June 15, 1965 J. W. BERGEN ETAL 3,188,982
DRIVE MECHANISM FOR COLLAPSIBLE TRAILER HITCHES ON RAILWAY CARS
Filed Oct. 11, 1963 2 Sheets-Sheet 1

INVENTORS
JAMES W. BERGEN
EDWARD F. COVE
BY
AGENT

June 15, 1965  J. W. BERGEN ETAL  3,188,982
DRIVE MECHANISM FOR COLLAPSIBLE TRAILER HITCHES ON RAILWAY CARS
Filed Oct. 11, 1963  2 Sheets-Sheet 2
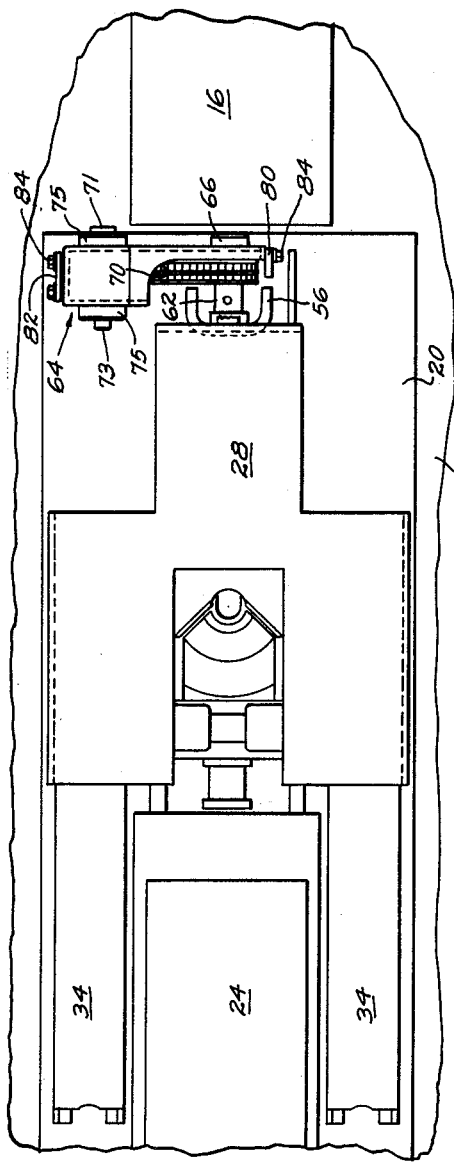
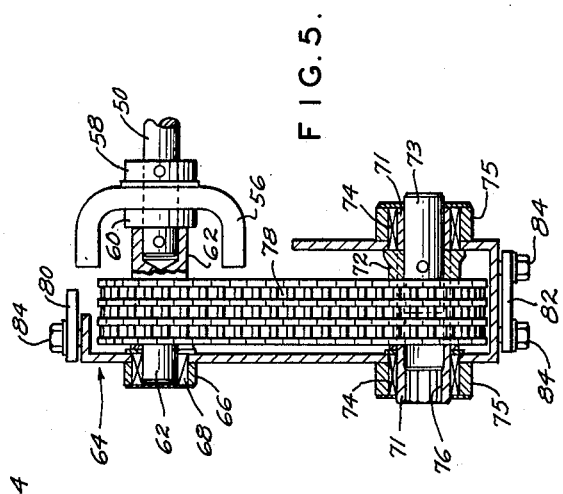
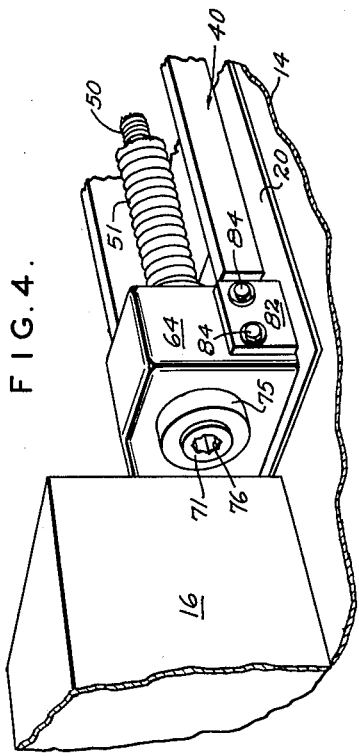

United States Patent Office 3,188,982
Patented June 15, 1965

3,188,982
DRIVE MECHANISM FOR COLLAPSIBLE TRAILER HITCHES ON RAILWAY CARS
James W. Bergen, Lewisburg, and Edward F. Cove, Berwick, Pa., assignors to ACF Industries, Incorporated, New York, N.Y., a corporation of New Jersey
Filed Oct. 11, 1963, Ser. No. 315,601
1 Claim. (Cl. 105—368)

This invention relates to a drive mechanism for trailer hitches mounted on railway cars, and more particularly to such a drive mechanism for raising and lowering collapsible-type hitches on low level railway cars.

Trailer hitches on railway flat cars are employed to engage the king pin of trailers carried by the cars and to secure the trailers onto the railway cars. An example of such a trailer hitch is the trailer hitch shown and described in copending application Serial No. 819,192 filed June 9, 1959, now Patent No. 3,145,006 and entitled "Collapsible Trailer Support and Anchor," the entire disclosure of which is incorporated by this reference. A horizontally extending elevating screw is provided to raise and lower the collapsible-type hitch and has an end adapted to be engaged by a suitable power tool or the like for rotating the screw. Since highway trailers are normally mounted on flat cars having a so-called low-lever deck or floor, the draft gear housing adjacent each end of the car normally projects above the upper surface of the deck. When a trailer hitch such as the aforementioned hitch is positioned adjacent the draft gear housing, the elevating screw has its free end closely spaced from the adjacent end of the draft gear housing and only provides a limited working space which in many instances is insufficient for a power tool or the like to be placed between the end of the housing and the elevating screw for rotating the screw.

It is an object of this invention to provide an offset drive mechanism for raising and lowering a trailer hitch on a railway car in a minimum of time.

It is a further object of the present invention to provide a drive mechanism for raising and lowering a collapsible trailer hitch positioned adjacent the draft gear housing which projects above the deck or floor on a low level railway car.

Briefly described, the invention comprises a drive mechanism for a trailer hitch on a railway flat car, the trailer hitch being raised and lowered by rotation of an elevating screw extending generally along the longitudinal center line of the car. The drive mechanism includes a driving member mounted in offset relation to the longitudinal axis of the elevating screw, a driven member secured to the free end of the elevating screw with a driving connection between the driving and driven members whereby upon actuation of the driving member the elevating screw is rotated to raise and lower the hitch. Such an arrangement permits a power tool or the like to engage the driving member even when the free end of the elevating screw is positioned closely adjacent a draft gear housing or other obstruction which projects above the deck of the railway car and limits the accessibility of the elevating screw. Other objects and features will be in part apparent and in part pointed out hereinafter.

The invention accordingly comprises the constructions hereinafter described, the scope of the invention being indicated in the followings claim.

In the accompanying drawings, in which one of various possible embodiments of the invention is illustrated.

FIGURE 3 is a plan view of the hitch of FIGURES 1 and 2 in collapsed position, the hitch being closely spaced from the adjacent end of the draft gear housing on a railway car;

FIGURE 4 is an enlarged perspective view of the drive mechanism showing the engageable end of the driving member adapted to be engaged by a suitable power tool or the like and offset from the adjacent draft gear housing; and FIGURE 5 is a section view of the drive mechanism of FIGURE 4, certain parts being shown in elevation.

Corresponding reference characters indicate corresponding parts throughout the several views of the drawings.

Figure 1:
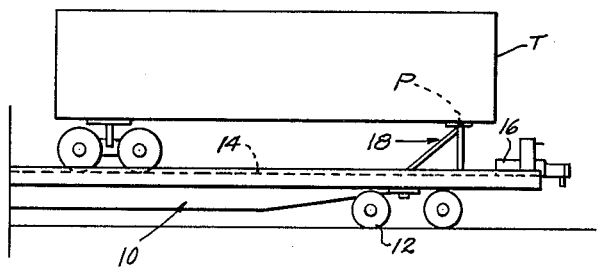
FIGURE 1 is a diagrammatic view of a trailer hitch mounted on a low level railway flat car and engaging the king pin of a trailer to secure the trailer, the draft gear housing of the flat car extending above the level of the deck.

Referring to FIGURE 1 of the drawings, a railway flat car is generally designated 10 and has a wheel assembly 12 thereon. Forming a support on the upper surface of the car 10 is a floor plate 14 on which a trailer T is supported. Projecting above the upper level of deck or floor plate 14 is draft gear housing 16 mounted in conventional manner on railway car 10. Secured to car 10 adjacent draft gear housing 16 is a trailer hitch generally designated 18 and adapted to engage the kingpin P of trailer T to secure the trailer on flat car 10. Hitch 18 is adapted to be raised and lowered and is straddled in collapsed position by the trailers when they are loaded and unloaded from flat car 10.

Figure 2:
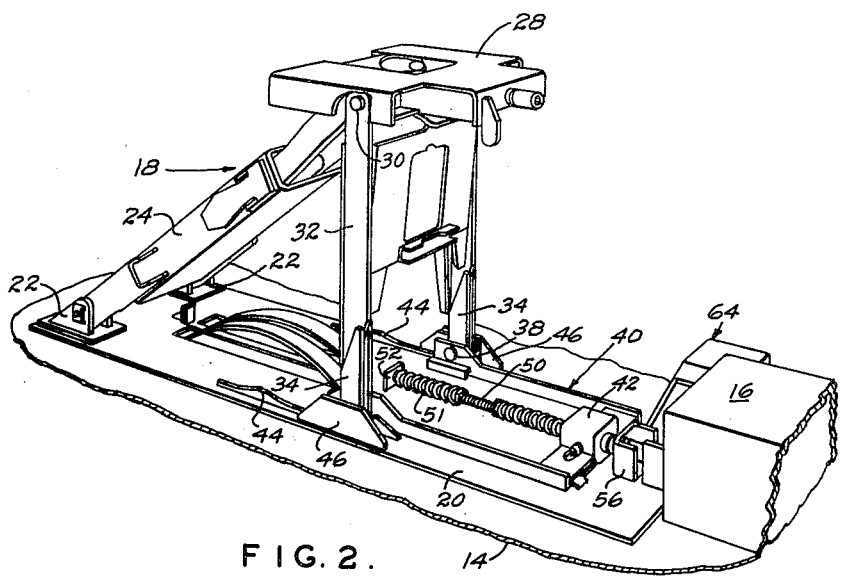
FIGURE 2 is an enlarged perspective view of the trailer hitch of FIGURE 1 in erected position, the drive mechanism being offset laterally from the longitudinal center line of the car to permit access to the driving member.

Referring to FIGURES 2 and 3, hitch 18 is mounted on a base plate or saddle 20 which is secured to deck plate 14. It is to be understood that hitch 18 may be mounted directly to deck plate 14 or base plate 20 may be secured to other structure, such as the underframe, if desired. Pivotally mounted on brackets 22 secured to base plate 20 is a diagonal strut or brace 24. Mounted on the upper end of brace 24 is a support plate or saddle 28 adapted to engage and lock kingpin P of trailer T as shown and described in the above mentioned copending application Serial No. 819,192. A pin 30 on each side of saddle 28 mounts plate 28 on diagonal 24. A vertical strut or support 32 is pivotally mounted by pins 30 to mounting plate 28. The lower end of vertical support 32 has legs 34, each of which is bifurcated to receive rollers on roller shafts 38. Mounted on roller shafts 38 is a slide yoke generally designated 40 and having a slide block 42. A cam track 44 is secured to each side of base plate 20 and support the rollers thereon. Extensions 46 and cam tracks 44 aid in guiding the movement of slide yoke 40 as it moves horizontally back and forth relative to base plate 20 for raising and lowering of hitch 18.

To move slide yoke 40 back and forth horizontally, an elevating screw 50 is secured to a bracket 52 on base plate 20 and has a flexible cover 51 thereover to protect screw 50 against foreign matter and to provide a protective housing for lubricant on screw 50. Elevating screw 50 engages slide block 42 and upon rotation moves slide block 42 and slide yoke 40 back and forth to raise and lower mounting plate 28. Supporting an unthreaded end portion of elevating screw 50 is bracket 56. A collar 58 is secured to elevating screw 50 on one side of bracket 56 and a bearing 60 is positioned on the opposite side of bracket 56.

Receiving the extending unthreaded end of elevating screw 50 is a sprocket 62 mounted in a housing generally designated 64. An outer sleeve 66 is secured to housing 64 and sprocket shaft 62 is adapted for rotation in bearing 68 between collar 66 and sprocket shaft 62. Housing 64 is cut away at 70 to form an opening extending upwardly from plates 14 and 20 to receive the extending end of elevating screw 50 and bracket 56 as shown in FIGURE 3.

Mounted in offset relation to the draft gear housing 16 is a hollow shaft 71 having sprocket 72 mounted thereon for rotation. A stub shaft 73 is received within an end of hollow sprocket shaft 71. Bearings 74 on each side of housing 64 are mounted between support rings 75 secured to housing 64 and sprocket shaft 71. An open end of sprocket shaft 71 opposite stub shaft 73 forms a splined socket 76 in which a suitable power tool, such as a power wrench or the like, may be inserted to rotate shaft 71 and sprocket 72. A suitable sprocket chain 78 extends over sprockets 62 and 72 to form a driving connection therebetween.

Extensions 80 and 82 are secured to base plate 20 at opposite ends of housing 64. Bolts 84 secure housing 64 in removable manner to extensions 80 and 82. Thus, housing 64, sprockets 62, 72 and sprocket chain 78 form a removable drive unit which may be mounted on a flat car having existing trailer hitches. Also, the removable unit may be removed, if desired.

The present invention provides for a drive mechanism for a forwardly collapsing trailer hitch having a driving member offset laterally from a longitudinal center line of the railway car. The drive mechanism utilizes the relatively small clearance between the draft gear housing and the elevating screw so that a power tool or the like may be employed to power the driving member without the draft gear housing obstructing or interfering with the use of the power tool.

In view of the above, it will be seen that the several objects of the invention are achieved and other advantageous results obtained.

As various changes could be made in the above constructions without departing from the scope of the invention it is intended that all matter contained in the above description or shown in the accompanying drawings shall be interpreted as illustrative and not in a limiting sense.

What is claimed is:

In a railway flat car having a deck plate for supporting trailers, a generally box-shaped draft gear housing projecting above the upper surface of the deck plate and extending rearwardly from an end of the railway car, a collapsible trailer hitch mounted on the car in general alignment with the longitudinal axis of the housing adjacent an end of the car and collapsing forwardly to a position closely adjacent the draft gear housing, said hitch including a saddle for engaging the king pin of a trailer and an elevating screw for raising and lowering the saddle, the elevating screw extending in a generally horizontal direction longitudinally of the car and having a free end disposed a relatively small distance from the rear end of said draft gear housing insufficient to permit a suitable power tool or the like between the elevating screw and the draft gear housing for rotating the elevating screw, the improvement comprising an offset drive mechanism secured to the deck plate closely adjacent the draft gear housing and operatively connected to the free end of said elevating screw in the space between the rear end of the housing and said free end for raising and lowering the saddle, said mechanism comprising a driven sprocket secured to the free end of said elevating screw, a drive sprocket mounted in lateral offset relation to said draft gear housing and in alignment with the driven sprocket transversely of the car, a sprocket chain connecting the sprockets in driving relation, and a socket on said drive sprocket having its longitudinal axis extending longitudinally of the car in lateral offset relation to the draft gear housing and adapted to be engaged by a suitable power tool or the like to rotate said driven sprocket and said elevating screw for raising and lowering the saddle, a support bracket on the deck plate for supporting the free end of said elevating screw, and a housing extending between said sprockets, said housing having a portion thereof cut away to form an opening extending upwardly from the deck plate to receive at least a portion of said support bracket and the extending end of the elevating screw.

References Cited by the Examiner
UNITED STATES PATENTS

| | | | |
|---|---|---|---|
| 2,624,416 | 1/53 | Larsen | 74—11 |
| 3,003,434 | 10/61 | Clejan | 105—368 |
| 3,029,654 | 4/62 | Hill | 74—216.5 |
| 3,081,716 | 3/63 | Szczepanik | 105—368 |
| 3,102,497 | 9/63 | Candlin et al. | 105—368 |

MILTON BUCHLER, *Primary Examiner.*

LEO QUACKENBUSH, *Examiner.*